United States Patent
Yamasaki et al.

(10) Patent No.: US 9,148,563 B2
(45) Date of Patent: Sep. 29, 2015

(54) IMAGING DEVICE FOR PERFORMING PROCESSING OF IMAGE DATA ON THE BASIS OF PRIORITY

(71) Applicant: Panasonic Corporation, Osaka (JP)

(72) Inventors: Masato Yamasaki, Osaka (JP); Masataka Nabeshima, Osaka (JP); Masayuki Ozaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 11 days.

(21) Appl. No.: 13/945,963

(22) Filed: Jul. 19, 2013

(65) Prior Publication Data

US 2014/0132792 A1 May 15, 2014

(30) Foreign Application Priority Data

Nov. 15, 2012 (JP) .................................. 2012-251442

(51) Int. Cl.
*H04N 5/228* (2006.01)
*H04N 5/232* (2006.01)
*H04N 1/21* (2006.01)
*G08B 13/196* (2006.01)

(52) U.S. Cl.
CPC ...... *H04N 5/23229* (2013.01); *G08B 13/19665* (2013.01); *H04N 1/2141* (2013.01); *H04N 5/23245* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 5,949,950 A * | 9/1999 | Kubo | 386/239 |
| 6,243,531 B1 * | 6/2001 | Takeuchi et al. | 386/224 |
| 8,542,930 B1 * | 9/2013 | Negro et al. | 382/190 |
| 2009/0295977 A1 * | 12/2009 | Sato | 348/333.12 |
| 2010/0066891 A1 * | 3/2010 | Kawashima | 348/333.11 |
| 2010/0315521 A1 * | 12/2010 | Kunishige et al. | 348/220.1 |
| 2012/0098987 A1 * | 4/2012 | Tsuda | 348/222.1 |
| 2013/0258136 A1 * | 10/2013 | Lee | 348/231.99 |

FOREIGN PATENT DOCUMENTS

| | | |
|---|---|---|
| JP | 11-88761 | 3/1999 |
| JP | 2001-320612 | 11/2001 |
| JP | 2006-217510 | 8/2006 |

\* cited by examiner

*Primary Examiner* — Twyler Haskins
*Assistant Examiner* — Wesley J Chiu
(74) *Attorney, Agent, or Firm* — Panasonic Patent Center (57) ABSTRACT

A digital camera includes a CCD image sensor that produces a plurality of sets of image data by continuously capturing a subject, a controller that sets the priority for executing image processing on at least one of the plurality of sets of image data, and an image processor that subjects a plurality of sets of image data to image processing on the basis of the priority for executing image processing.

10 Claims, 6 Drawing Sheets

IMAGING DEVICE FOR PERFORMING PROCESSING OF IMAGE DATA ON THE BASIS OF PRIORITY

CROSS-REFERENCE TO RELATED APPLICATIONS

This application claims priority under 35 U.S.C. §119 to Japanese Patent Application No. 2012-251442 filed on Nov. 15, 2012. The entire disclosure of Japanese Patent Application No. 2012-251442 is incorporated herein by reference.

BACKGROUND

1. Technical Field

The technical field relates to an imaging device.

2. Background Information

With a conventional digital camera, when continuous capture is executed, image data that has been recorded to a memory is processed sequentially in time series. After the processing ends for the image data last recorded to the memory, the last image data is displayed on the screen (see Japanese Laid-Open Patent Application 2006-217510).

This disclosure provides an imaging device that is more convenient for the user in the reproduction of images.

SUMMARY

The imaging device disclosed herein comprises an imaging component, a controller, and an image processor. The imaging component is configured to capture continuously a subject and produces a plurality of sets of image data. The controller is configured to set the priority for executing image processing on at least one of the plurality of sets of image data. The image processor is configured to execute image processing with respect to the plurality of sets of image data on the basis of the priority.

With the imaging device disclosed herein, user convenience is improved in the reproduction of images.

BRIEF DESCRIPTION OF THE DRAWINGS

Referring now to the attached drawings, which form a part of this original disclosure.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

Embodiments will now be described in detail through reference to the drawings as needed. However, unnecessarily detailed descriptions may be omitted. For example, redundant descriptions of components that are substantially the same, or detail descriptions of things that are already well known, may be omitted. The purpose of this is to avoid making the following description overly redundant, and to facilitate an understanding on the part of a person skilled in the art.

The appended drawings and the following description are provided so that a person skilled in the art will fully understand this disclosure, and does not intend thereby to limit the subject of the patent claims.

In the following embodiments, a digital camera will be described as an example of an imaging device. In the following description, assuming that the digital camera is in its normal orientation (hereinafter also referred to as landscape orientation), the direction facing the subject will be referred to as "forward," the direction facing away from the subject as "rearward," vertically upward as "upward," vertically downward as "downward," to the right in a state of facing directly at the subject as "to the right," and to the left in a state of facing directly at the subject as "to the left."

First Embodiment

A digital camera 100 (an example of an imaging device) pertaining to this embodiment will be described through reference to FIGS. 1 to 8. The digital camera 100 is an imaging device that is capable of capturing both moving and still pictures.

1-1. Configuration of Digital Camera

Figure 1:
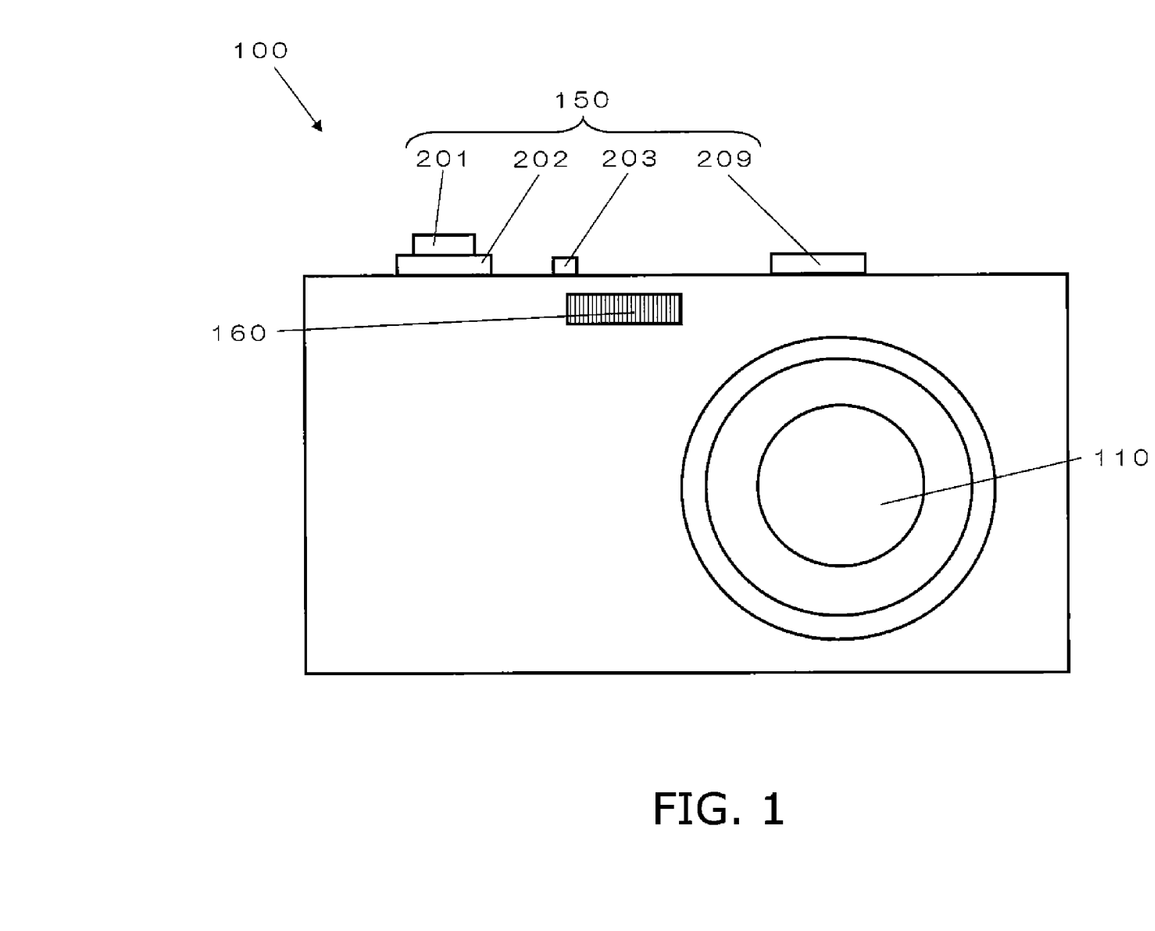
FIG. 1 is a front view of a digital camera pertaining to first to third embodiments.

FIG. 1 is a front view of a digital camera pertaining to this embodiment. As shown in FIG. 1, the digital camera 100 comprises on its front face a flash 160 and a lens barrel that contains an optical system 110. A interface unit 150 is provided to the top face of the digital camera 100. The interface unit 150 includes a still picture release button 201, a zoom lever 202, a power button 203, a scene dial 209, and so on.

Figure 2:
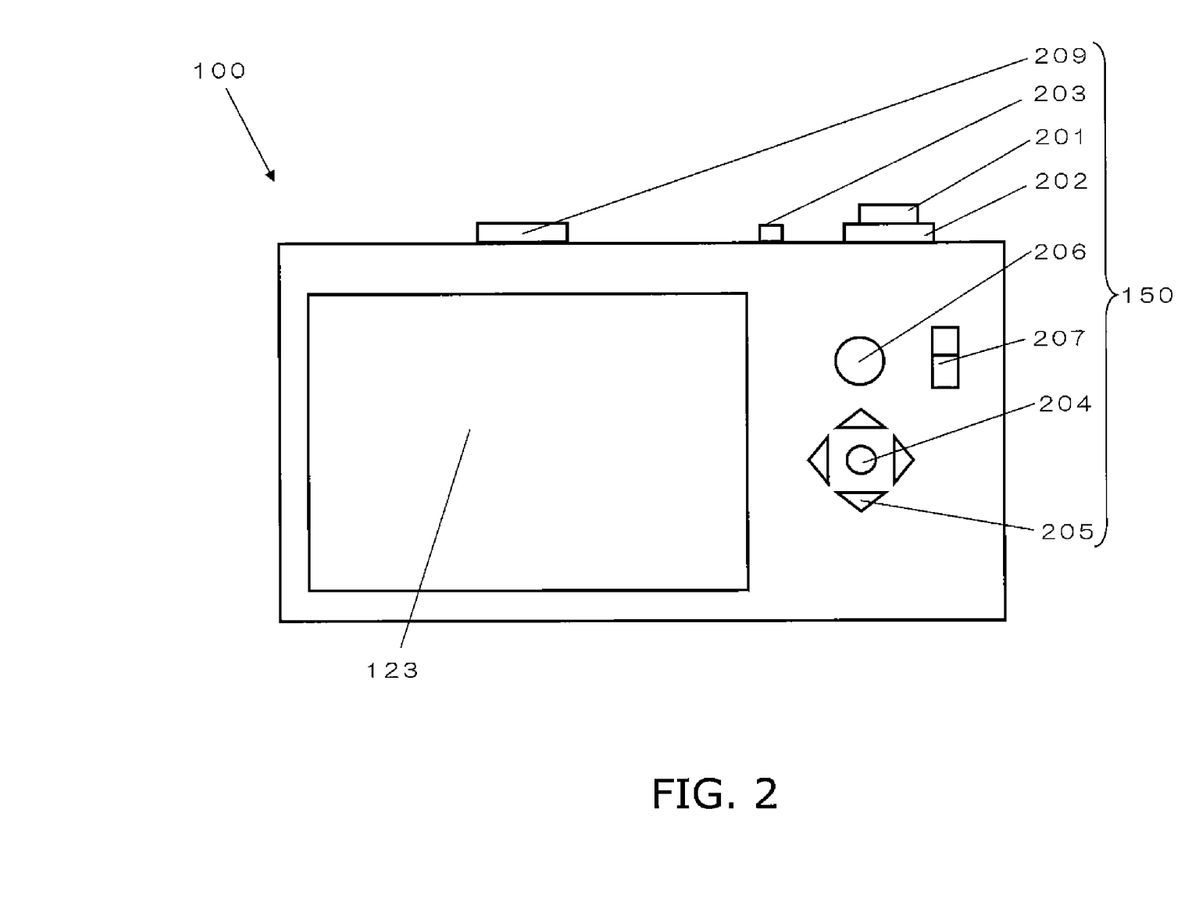
FIG. 2 is a rear view of the digital camera pertaining to the first to third embodiments.

FIG. 2 is a rear view of the digital camera pertaining to this embodiment. As shown in FIG. 2, the interface unit 150 is also provided to the rear face of the digital camera 100. The interface unit 150 further includes a liquid crystal monitor 123, a center button 204, a cross key 205, a moving picture release button 206, a mode switch 207, and so forth.

Figure 3:
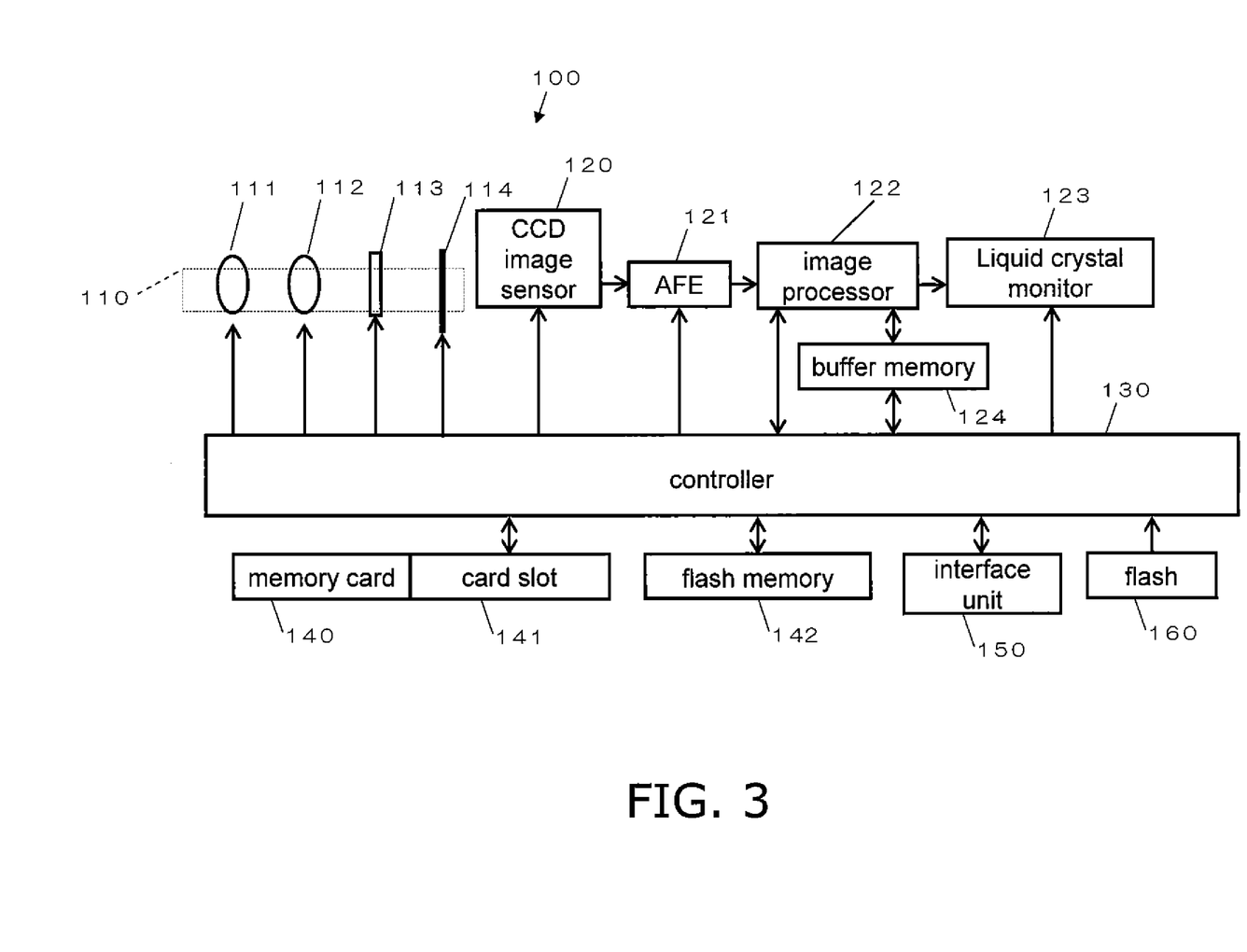
FIG. 3 is a block diagram of the digital camera pertaining to the first to third embodiments.

FIG. 3 is a block diagram of the digital camera pertaining to this embodiment. As shown in FIG. 3, the digital camera 100 comprises the optical system 110, a CCD image sensor 120, an AFE (analog front end) 121, an image processor 122, a buffer memory 124, the liquid crystal monitor 123, a controller 130, a card slot 141, a memory card 140, a flash memory 142, the interface unit 150, and the flash 160.

The optical system 110 forms a subject image. The optical system 110 has a focus lens 111, a zoom lens 112, an aperture 113, and a shutter 114. As another embodiment, the optical system 110 may include an optical shake correcting lens OIS (optical image stabilizer). The lenses included in the optical system 110 may be constituted by any number of lenses or by any number of groups of lenses.

The focus lens 111 is used to adjust the focal state of the subject. The zoom lens 112 is used to adjust the field angle of the subject. The aperture 113 is used to adjust the amount of light that is incident on the CCD image sensor 120. The shutter 114 is used to adjust the exposure time for light incident on the CCD image sensor 120. The focus lens 111, the zoom lens 112, the aperture 113, and the shutter 114 are each driven by a DC motor, a stepping motor, or another such drive unit, according to a control signal issued from the controller 130.

The CCD image sensor 120 is an imaging element that captures a subject image formed by the optical system 110. The CCD image sensor 120 produces frames of image data showing the subject image.

The APE (analog front end) 121 subjects the image data produced by the CCD image sensor 120 to various kinds of processing. More specifically, the APE 121 performs noise suppression by correlated double sampling, amplification to the input range width of an A/D converter by analog gain controller, A/D conversion by A/D converter, and so forth.

The image processor 122 subjects the image data that has undergone various kinds of processing by the AFE 121 to various other kinds of processing. The image processor 122 executes various kinds of processing on the image data. Examples of the various processing include smear correction, white balance correction, gamma correction, YC conversion processing, electronic zoom processing, compression processing, reduction processing, expansion processing, and so on. By executing this processing on the image data, the image processor 122 produces through-images and recorded images. In this embodiment, the image processor 122 is a microprocessor that executes a program, but in other embodiments, the image processor 122 may instead be a hard-wired electronic circuit, or may be constituted integrally with the controller 130, etc.

The controller 130 (an example of a controller) controls the overall operation of the entire digital camera 100. The controller 130 is constituted by a ROM, a CPU, and so forth. The ROM holds overall control programs and individual control programs. An overall control program is a program used to control the overall operation of the entire digital camera 100. An individual control program is a program related to file control, auto focus control (AF control), auto exposure control (AE control), and light emission control of the flash 160, and so forth.

The controller 130 uses a combination determination program to determine whether or not image data combination processing in an image combiner has been successful. The processing performed by the combination determination program will be discussed in detail below.

The controller 130 records to the memory card 140 and the flash memory 142 (hereinafter referred to as "the memory card 140, etc.") the image data that has been processed by the image processor 122, as still picture data or moving picture data. In this embodiment, the controller 130 is a microprocessor that executes a program, but may instead be a hard-wired electronic circuit. The controller 130 may also be constituted integrally with the image processor 122, etc.

The liquid crystal monitor 123 displays through-images, recorded images, etc. Through-images and recorded images are produced by the image processor 122. Through-images are a series of images produced continuously at regular time intervals while the digital camera 100 is in imaging mode. More precisely, the series of image data corresponding to this series of images is produced by the CCD image sensor 120 at regular time intervals. The user can capture images while checking the composition of the subject by referring to the through-image displayed on the liquid crystal monitor 123.

A recorded image is an image obtained by decoding (expanding) still picture data or moving picture data that has been recorded to the memory card 140, etc. A recorded image is displayed on the liquid crystal monitor 123 when the digital camera 100 is in reproduction mode. Still picture data or moving picture data stored in the buffer memory 124 is included in the recorded image.

In another embodiment, some other display capable of displaying images, such as an organic EL display, is used instead of the liquid crystal monitor 123.

The buffer memory 124 (an example of a recording component) is a volatile memory medium that functions as a working memory for the image processing unit 122 and the controller 130. In this embodiment, the buffer memory 124 is a DRAM.

The flash memory 142 is an internal memory of the digital camera 100. The flash memory 142 is a nonvolatile recording medium. The flash memory 142 has a customized category registration region and a current value holding region (not shown).

The memory card 140 can be removably inserted into the card slot 141. The card slot 141 is electrically and mechanically connected to the memory card 140.

The memory card 140 (an example of a recording component) is an external memory of the digital camera 100. The memory card 140 is a nonvolatile recording medium.

The interface unit 150 is a manipulation interface that is operated by the user. The interface unit 150 refers collectively to control buttons, control dials, and so forth provided to the exterior of the digital camera 100. The interface unit 150 includes the still picture release button 201, the moving picture release button 206, the zoom lever 202, the power button 203, the center button 204, the cross button 205, the mode switch 207, and the scene dial 209. The interface unit 150 sends signals corresponding to operational commands to the controller 130 when operated by the user.

The still picture release button 201 is a push button that is used to direct the timing of still picture recording. The moving picture release button 206 is a push button that is used to direct the timing of the start and end of moving picture recording. The controller 130 directs the image processor 122, etc., to produce still picture data or moving picture data at the timing when the release button 201 or 206 is pressed. The still picture data or moving picture data produced here is stored on the memory card 140, etc.

The zoom lever 202 is used to adjust the field angle between the wide angle end and the telephoto end. The controller 130 drives the zoom lens 112 according to operation of the zoom lever 202 by the user.

The power button 203 is a slide button for switching the supply of power on and off to the various components of the digital camera 100.

The center button 204 and the cross button 205 are push buttons. The user can operate the center button 204 and the cross button 205 to display various setting screens (including a setting menu screen and a quick setting menu screen (not shown)) on the liquid crystal monitor 123. The user can set the setting category values related to various conditions for imaging and reproduction on these setting screens.

The mode switch 207 is a slide switch for switching the digital camera 100 between imaging mode and reproduction mode.

The scene dial 209 is used to switch the scene mode. "Scene mode" is the collective term for modes set according to imaging conditions. Factors that affect imaging conditions include the subject and the imaging environment. The scene dial 209 is used to set one of a plurality of scene modes.

The scene modes include, for example, landscape mode, portrait mode, nighttime mode, and backlit mode. For example, the portrait mode is suited to capturing an image so that the skin tone of a person has the proper hue. Backlit mode is suited to imaging in an environment with a high contrast.

1-2. Overview of Digital Camera Operation

Figure 4:
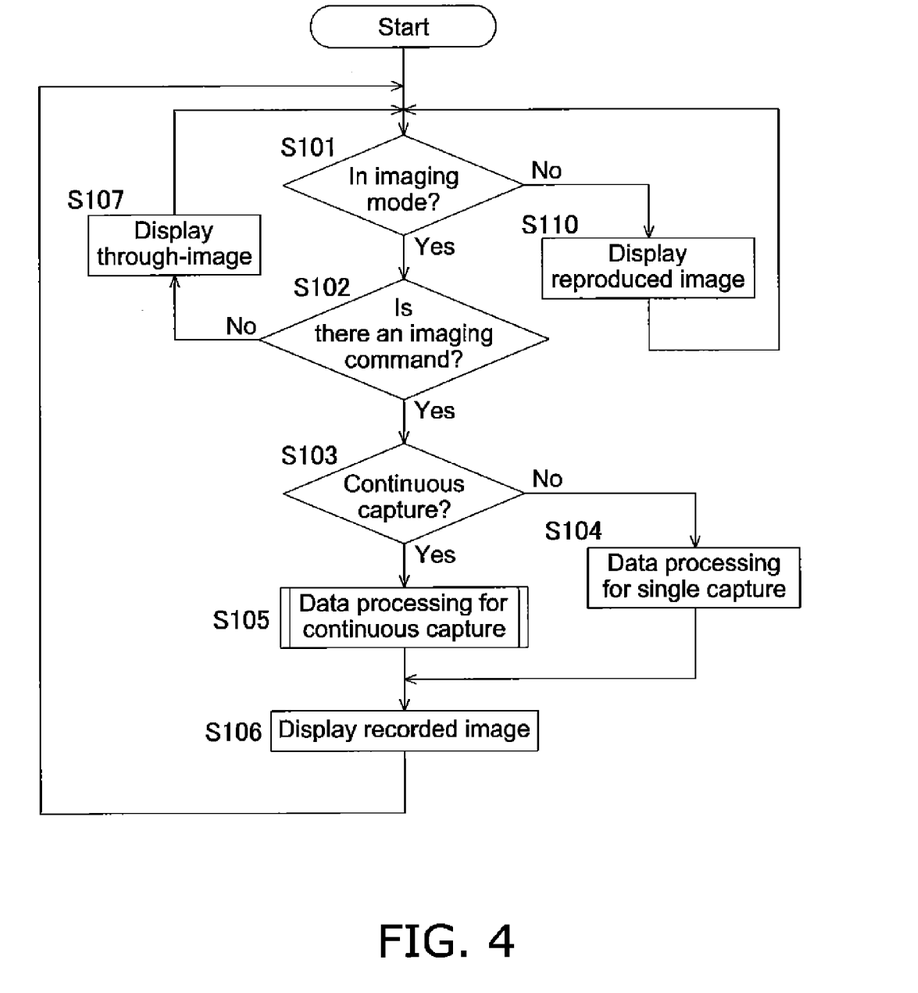
FIG. 4 is a flowchart illustrating the basic operation of the digital camera pertaining to the first to third embodiments.

FIG. 4 is a flowchart illustrating the characteristic operation of this digital camera.

When the user presses the power button 203 to switch on the power to the digital camera 100, the controller 130 refers to the setting of the mode switch 207. More precisely, the controller 130 determines whether the setting of the mode switch 207 is imaging mode or reproduction mode (S101).

If the mode switch 207 has been set to imaging mode (Yes in S101), the controller 130 goes into an imaging standby state in imaging mode. In this state, the controller 130 monitors the pressing of the still picture release button 201 by the user (S102). If the controller 130 has not detected the pressing of the still picture release button 201 by the user (No in S102), the through-image produced by the image processor 122 is displayed on the liquid crystal monitor 123 (S107). The controller 130 then repeats the processing from S101.

On the other hand, if the still picture release button 201 has been pressed by the user, the controller 130 detects the depressed state of the still picture release button 201 (Yes in S102). The controller 130 then determines whether the imaging is continuous or single capture according to the depressed state of the still picture release button 201 (S103). If the imaging here is determined to be single capture (No in S103), single capture-use data processing, such as data production, image processing, and image recording, is executed (S104). For example, the image processor 122 produces one set of image data and executes the above-mentioned various kinds of processing on this image data. Once the image processing is finished, the recording-use image data is recorded to the memory card 140. The recording-use image data is used to display a recorded image on the liquid crystal monitor 123 (S106). The controller 130 then repeats the processing from S101. The recorded image here corresponds to a review-use image, for example.

Meanwhile, if the imaging is determined to be continuous capture (Yes in S103), data production processing, image processing, and image recording related to continuous capture are executed (S105). For example, the image processor 122 produces a plurality of sets of image data and executes the above-mentioned various kinds of processing on this image data. Once the image processing is finished, the recording-use image data is recorded to the memory card 140. The recording-use image data is used to display a recorded image on the liquid crystal monitor 123 (S106). The controller 130 then repeats the processing from S101.

After this, the controller 130 refers to the mode set with the mode switch 207 (imaging mode or reproduction mode) (S101). If the mode switch 207 here has been set to reproduction mode (No in S101), the controller 130 changes the operating mode from imaging mode to reproduction mode. The newest image captured in imaging mode is then displayed on the liquid crystal monitor 123 as a reproduced image (S110).

1-3. Operation of Digital Camera During Continuous Capture

Figure 5:
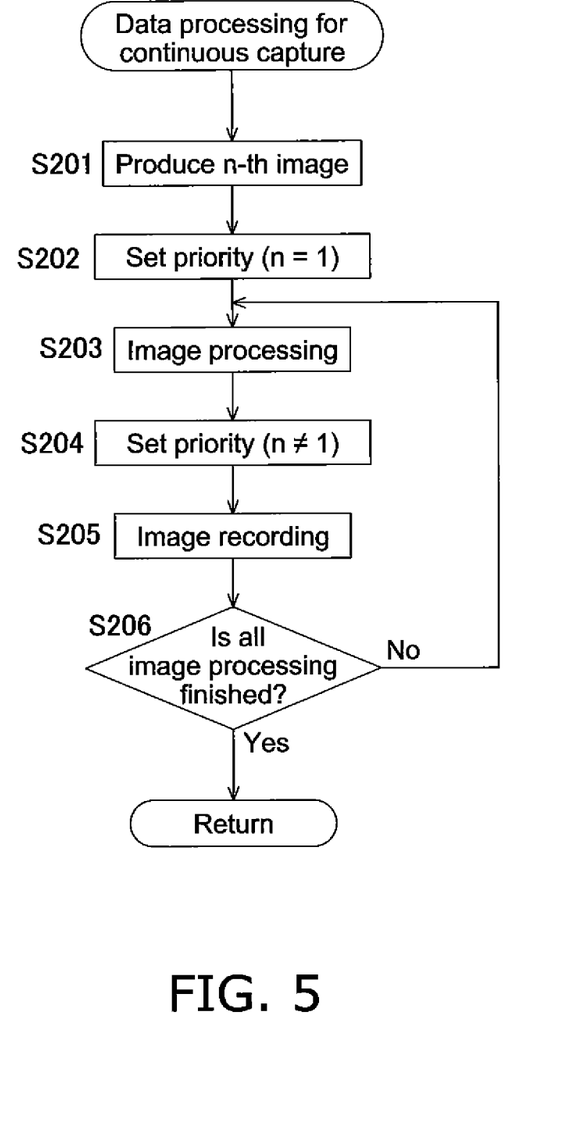
FIG. 5 is a flowchart illustrating the data processing operation during continuous capture pertaining to the first embodiment.

The data processing operation during continuous capture, which is a feature of this disclosure, will now be described in detail through reference to FIGS. 5 and 6. FIG. 5 is a flowchart illustrating the data processing operation during continuous capture.

Figure 6:
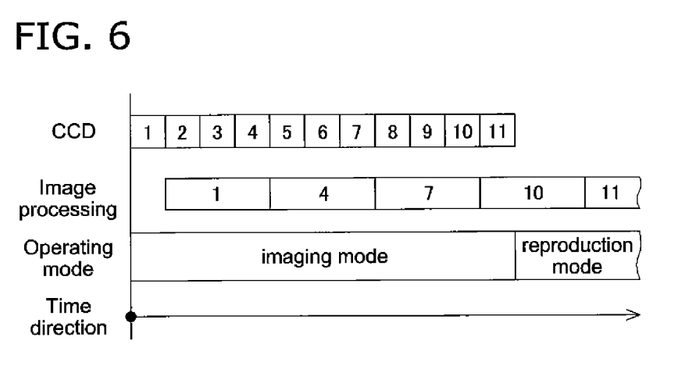
FIG. 6 is a simplified diagram illustrating the data processing operation during continuous capture pertaining to the first embodiment.

The blocks shown next to "CCD" in FIG. 6 indicate the order in which the sensor image data was produced. The blocks shown next to "image processing" indicate the sensor image data that is to undergo image processing (the numerals of the "CCD" blocks). The blocks shown next to "operating mode" indicate the operating mode being executed.

FIG. 6 shows an example when continuous capture is executed 11 times. In this case, the operating mode is switched from imaging mode to reproduction mode at the point when the eleventh set of sensor image data has been produced. It should be noted that exemplary embodiment can be applied no matter how many times continuous capture is executed.

If the controller 130 determines that the imaging is continuous capture (Yes in S103 of FIG. 4), and continuous capture data processing is executed (S105 in FIG. 4), first the CCD image sensor 120 produces the first set of sensor image data (S201). This first set of sensor image data is then recorded to the buffer memory 124.

When the sensor image data has been recorded to the buffer memory 124, the controller 130 sets a priority N for executing image processing on the sensor image data recorded to the buffer memory 124 (S202). Here, the priority N is set on the basis of the time stamp (an example of recording information) of the sensor image data. For example, since the first set of sensor image data is initial data, the priority N is the highest (N=1). More specifically, since the first set of sensor image data always has the most recent time stamp, the priority N is always the highest (N=1). The smaller is the numerical value of the priority N, the higher is the priority.

Then, the image processor 122 executes image processing on the basis of the priority N (S203). For example, the first set of sensor image data is read from the buffer memory 124, and the above-mentioned various kinds of image processing are executed on the first set of sensor image data.

While this image processing is being executed, the CCD image sensor 120 produces second to fourth sets of sensor image data, for example. These three sets of sensor image data are recorded to the buffer memory 124.

As discussed above, the controller 130 then sets the priority N for executing image processing on the sensor image data recorded to the buffer memory 124 (S204). Here again, the priority N is set on the basis of the time stamp of the sensor image data. The setting of the priority N is not executed for data that has already undergone image processing.

For example, as a plurality of sets of sensor image data are recorded sequentially to the buffer memory 124, the controller 130 sets the priority N so that it increases from the image data with the oldest time stamp toward that with the most recent. For instance, while image processing is being executed on the first set of sensor image data, the controller 130 sets the priority N so that the priority N rises for the second set of sensor image data, the third set of sensor image data, and the fourth set of sensor image data, in that order. More specifically, the priority is "N=3," "N=2," and "N=1" for the second set of sensor image data, the third set of sensor image data, and the fourth set of sensor image data, in that order.

Next, when the image processor 122 finishes image processing on the first set of sensor image data, the recording-use image data that has undergone image processing is recorded to the memory card 140 (S205). The controller 130 monitors whether or not all of the image processing has been finished (S206). If all of the image processing has been finished (Yes in S206), the controller 130 ends the continuous capture data processing. On the other hand, the controller 130 continues continuous capture data processing if all of the image processing has not been finished (No in S206).

Then, if continuous capture data processing is being continued (No in S206), the controller 130 sends a command to the image processor 122 to refer to the buffer memory 124 and process the sensor image data on the basis of the above-mentioned priority N. The image processor 122 then executes image processing on the fourth set of sensor image data with the highest priority N (N=1) (S203).

While image processing is being executed on the fourth set of sensor image data, a plurality of further sets of sensor image data are added to the buffer memory 124. During this time, the controller 130 sets the priority N so that the priority N increases from the image data with the oldest date stamp toward the most recent image data (S204). For example, the controller 130 sets the priority N so that it increases in the order of the second set of sensor image data, the third set of sensor image data, the fifth set of sensor image data, the sixth set of sensor image data, and the seventh set of sensor image data. More specifically, the priority is "N=5," "N=4," "N=3," "N=2," and "N=1" for the second set of sensor image data, the third set of sensor image data, the fifth set of sensor image data, the sixth set of sensor image data, and the seventh set of sensor image data, in that order.

Next, when the image processor 122 finishes image processing on the fourth set of sensor image data, the recording-use image data that has undergone image processing is recorded to the memory card 140 (S205). Here again, as discussed above, the controller 130 determines whether or not to continue continuous capture data processing depending on whether or not all of the image processing is finished (S206).

Then, if the continuous capture data processing is continued (No in S206), just as described above, the image processor 122 executes image processing on the seventh set of sensor image data whose priority N at this point is the highest (N=1). While the image processing is being executed on the seventh set of sensor image data, the controller 130 sets the priority N so that it increases in the order of the second set of sensor image data, the third set of sensor image data, the fifth set of sensor image data, the sixth set of sensor image data, the eighth set of sensor image data, the ninth set of sensor image data, and the tenth set of sensor image data (S204).

More specifically, the priority is "N=7," "N=6," "N=5," "N=4," "N=3," "N=2," "N=1," in the order of the second set of sensor image data, the third set of sensor image data, the fifth set of sensor image data, the sixth set of sensor image data, the eighth set of sensor image data, the ninth set of sensor image data, and the tenth set of sensor image data.

Then, when the image processor 122 finishes image processing of the seventh set of sensor image data, the recording-use image data that has undergone image processing is recorded to the memory card 140 (S205). Here again, as discussed above, the controller 130 determines whether or not to continue continuous capture data processing depending on whether or not all of the image processing is finished (S206).

Then, if the continuous capture data processing is continued (No in S206), just as described above, the image processor 122 executes image processing on the tenth set of sensor image data whose priority N at this point is the highest (N=1). During this time, the controller 130 sets the priority N so that it increases in the order of the second set of sensor image data, the third set of sensor image data, the fifth set of sensor image data, the sixth set of sensor image data, the eighth set of sensor image data, the ninth set of sensor image data, and the eleventh set of sensor image data (S204).

More specifically, the priority is "N=7," "N=6," "N=5," "N=4," "N=3," "N=2," "N=1," in the order of the second set of sensor image data, the third set of sensor image data, the fifth set of sensor image data, the sixth set of sensor image data, the eighth set of sensor image data, the ninth set of sensor image data, and the eleventh set of sensor image data.

Then, when the image processor 122 finishes image processing of the tenth set of sensor image data, the recording-use image data that has undergone image processing is recorded to the memory card 140 (S205). Here again, as discussed above, the controller 130 determines whether or not to continue continuous capture data processing depending on whether or not all of the image processing is finished (S206).

Then, if the continuous capture data processing is continued (No in S206), just as described above, the image processor 122 executes image processing on the basis of the above-mentioned priority N (S203). For example, first the image processor 122 executes image processing on the eleventh set of sensor image data (the last set of sensor image data). Similarly, the image processor 122 executes image processing in the order of the ninth set of sensor image data, the eighth set of sensor image data, the sixth set of sensor image data, the fifth set of sensor image data, the third set of sensor image data, and the second set of sensor image data.

In this state, since the setting of the priority N is finished for all of the sensor image data, the recording-use image data that has undergone image processing is recorded to the memory card 140 (S205). When image processing is finished for all of the sensor image data, the data processing operation during continuous capture is ended (Yes in S206). Also, as discussed above, the data processing operation during continuous capture is repeatedly executed until image processing is finished for all of the sensor image data (No in S206).

1-4. Effect of this Digital Camera

With prior art, during continuous capture, the image data recorded to the memory was sequentially processed in time series, so when the operating mode was switched from imaging mode to reproduction mode at the end of continuous capture, there was the risk that the wait time for reproducing the last set of image data on the liquid crystal monitor 123 would end up being long. In contrast, with the digital camera 100 in this disclosure, as discussed above, image processing is executed with respect to a plurality of sets of image data on the basis of their priority N, so even if the imaging mode is switched to reproduction mode at the end of continuous capture, the wait time for reproducing the last set of image data on the liquid crystal monitor 123 can be shortened. Thus, the digital camera 100 of this disclosure is more convenient for the user when reproducing an image.

An example was given here of a case in which the eleventh image was the image captured at the end of imaging (the last image) so as not to lose the general applicability of the argument. In contrast, if the tenth image is the image captured at the end of imaging (the last image), then the tenth image (the last image) can be displayed at the point when the image processing of the tenth image is complete, so the wait time can be further shortened.

Second Embodiment

In the second embodiment, the configuration of the digital camera, and the operation of the digital camera during continuous capture, are the same as in the first embodiment discussed above, so these will not be described again here. Only the operation of the digital camera during continuous capture that is a feature of the second embodiment will be described in detail below.

2-1. Operation of Digital Camera During Continuous Capture

The data processing operation during continuous capture that is a feature of this disclosure will now be described in detail through reference to FIGS. 5 and 7.

Figure 7:
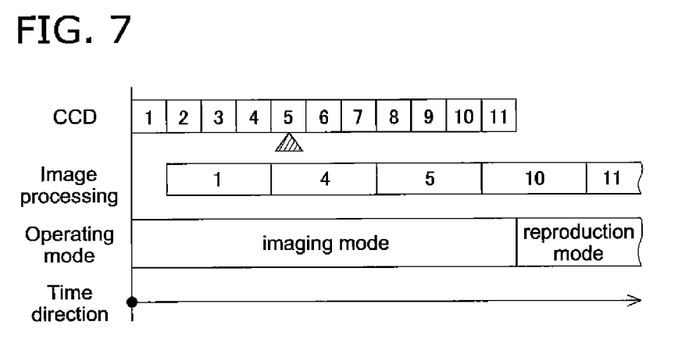
FIG. 7 is a simplified diagram illustrating the data processing operation during continuous capture pertaining to the second embodiment.

The blocks shown next to "CCD" in FIG. 7 indicate the order in which the sensor image data was produced. The blocks shown next to "image processing" indicate the sensor image data that is to undergo image processing (the numerals of the "CCD" blocks). The blocks shown next to "operating mode" indicate the operating mode being executed.

FIG. 7 shows an example when continuous capture is executed 11 times. In this case, the resource usage amount of the fifth set of sensor image data is above a specific threshold. To show this state, in FIG. 7 a triangular mark is attached to the block corresponding to the fifth set of sensor image data. The operating mode is switched from imaging mode to reproduction mode at the point when the eleventh set of sensor image data has been produced. The exemplary embodiment can be applied no matter how many times continuous capture is executed.

If the controller 130 determines that the imaging is continuous capture (Yes in S103 of FIG. 3), and continuous capture data processing is executed (S105 in FIG. 4), first the CCD image sensor 120 produces the first set of sensor image data (S201). This first set of sensor image data is then recorded to the buffer memory 124.

When the sensor image data has been recorded to the buffer memory 124, the controller 130 sets a priority N for executing image processing on the sensor image data recorded to the buffer memory 124 (S202). Here, the priority N is set on the basis of the time stamp of the sensor image data and the resource usage amount of the sensor image data (an example of resource usage information). For example, since the first set of sensor image data is initial data, the priority N is the highest (N=1). More specifically, since the first set of sensor image data always has the most recent time stamp, the priority N is always the highest (N=1).

The smaller is the numerical value of the priority N, the higher is the priority. How the priority N is set (how the numerical value is set) is the same as in the first embodiment, and will therefore not be described again.

Then, the image processor 122 executes image processing on the basis of the priority N (S203). For example, the first set of sensor image data is read from the buffer memory 124, and the above-mentioned various kinds of image processing are executed on the first set of sensor image data.

While this image processing is being executed, as shown in FIG. 7, the CCD image sensor 120 produces second to fourth sets of sensor image data, for example. These three sets of sensor image data are recorded to the buffer memory 124.

As discussed above, the controller 130 then sets the priority N for executing image processing on the sensor image data recorded to the buffer memory 124 (S204). Here, the priority N is set on the basis of the time stamp of the sensor image data and the resource usage amount of the sensor image data. The setting of the priority N is not executed for data that has already undergone image processing.

For example, as a plurality of sets of sensor image data are recorded sequentially to the buffer memory 124, the controller 130 sets the priority N so that it increases from the image data with the oldest time stamp toward that with the most recent. Furthermore, the controller 130 sets the priority N so that the priority N of sensor image data whose resource usage amount is over the specific threshold is higher than the priority N of the other sensor image data.

As shown in FIG. 7, while image processing is being executed on the first set of sensor image data, since there is no sensor image data whose resource usage amount is over the specific threshold, the controller 130 sets the priority N so that it increases in the order of the second set of sensor image data, the third set of sensor image data, and the fourth set of sensor image data.

Then, when the image processor 122 finishes image processing on the first set of sensor image data, the recording-use image data that has undergone image processing is recorded to the memory card 140 (S205). The controller 130 monitors whether or not all of the image processing has been finished (S206). If all of the image processing has been finished (Yes in S206), the controller 130 ends the continuous capture data processing. On the other hand, the controller 130 continues continuous capture data processing if all of the image processing has not been finished (No in S206).

Then, if continuous capture data processing is being continued (No in S206), the controller 130 sends a command to the image processor 122 to refer to the buffer memory 124 and process the sensor image data on the basis of the above-mentioned priority N. The image processor 122 then executes image processing on the fourth set of sensor image data with the highest priority N (N=1) (S203).

While image processing is being executed on the fourth set of sensor image data, as shown in FIG. 7, a plurality of further sets of sensor image data are added to the buffer memory 124. During this time, the controller 130 sets the priority N so that the priority N increases from the image data with the oldest date stamp toward the most recent image data. Next, the priority N is set so that the priority N of the sensor image data whose resource usage amount is over a specific threshold is higher than the priority N of the other sensor image data. For example, the controller 130 sets the priority N so that it increases in the order of the second set of sensor image data, the third set of sensor image data, the sixth set of sensor image data, the seventh set of sensor image data, and the fifth set of sensor image data (S204).

An example was given here of a case in which there was only one set of sensor image data whose resource usage amount was over the specific threshold, but if there are a plurality of sets of sensor image data whose resource usage amount is over the specific threshold, the controller 130 sets the priority N so that it increases from the image data with the oldest time stamp toward that with the most recent among the plurality of sets of sensor image data. Also, the priority N may be set so that it increases as the resource usage amount increases among the plurality of sets of sensor image data.

Next, when the image processor 122 finishes image processing on the fourth set of sensor image data, the recording-use image data that has undergone image processing is recorded to the memory card 140 (S205). Here again, as discussed above, the controller 130 determines whether or not to continue continuous capture data processing depending on whether or not all of the image processing is finished (S206).

Then, if the continuous capture data processing is continued (No in S206), the image processor 122 executes image processing on the fifth set of sensor image data whose priority N at this point is the highest (N=1) (S203). While the image processing is being executed on the fifth set of sensor image data, the controller 130 sets the priority N so that it increases in the order of the second set of sensor image data, the third set of sensor image data, the sixth set of sensor image data, the seventh set of sensor image data, the eighth set of sensor image data, the ninth set of sensor image data, and the tenth set of sensor image data (S204).

Then, when the image processor 122 finishes image processing of the fifth set of sensor image data, the recording-use image data that has undergone image processing is recorded to the memory card 140 (S205). The image processor 122 executes image processing on the tenth set of sensor image data whose priority N at this point is the highest (N=1). During this time, the controller 130 sets the priority N so that it increases in the order of the second set of sensor image data, the third set of sensor image data, the sixth set of sensor image data, the seventh set of sensor image data, the eighth set of sensor image data, the ninth set of sensor image data, and the eleventh set of sensor image data (S204).

Then, when the image processor 122 finishes image processing of the tenth set of sensor image data, the recording-use image data that has undergone image processing is recorded to the memory card 140 (S205). Here again, as discussed above, the controller 130 determines whether or not to continue continuous capture data processing depending on whether or not all of the image processing is finished (S206).

Then, if the continuous capture data processing is continued (No in S206), the image processor 122 executes image processing on the basis of the above-mentioned priority N (S203). For example, first the image processor 122 executes image processing on the eleventh set of sensor image data (the last set of sensor image data). Similarly, the image processor 122 executes image processing in the order of the ninth set of sensor image data, the eighth set of sensor image data, the seventh set of sensor image data, the sixth set of sensor image data, the third set of sensor image data, and the second set of sensor image data.

In this state, since the setting of the priority N is finished for all of the sensor image data, the recording-use image data that has undergone image processing is recorded to the memory card 140 (S205). When image processing is finished for all of the sensor image data, the data processing operation during continuous capture is ended (Yes in S206). Also, as discussed above, the data processing operation during continuous capture is repeatedly executed until image processing is finished for all of the sensor image data (No in S206).

2-2. Effect of this Digital Camera

With the digital camera 100 in this disclosure, as discussed above, since image processing is executed with respect to a plurality of sets of image data on the basis of the priority N, even if the imaging mode is switched to reproduction mode at the end of continuous capture, the wait time for reproducing the last set of image data on the liquid crystal monitor 123 can be shortened.

An example was given here of a case in which the eleventh image was the image captured at the end of imaging (the last image) so as not to lose the general applicability of the argument. In contrast, if the tenth image is the image captured at the end of imaging (the last image), then the tenth image (the last image) can be displayed at the point when the image processing of the tenth image is complete, so the wait time can be further shortened.

Furthermore, with the digital camera 100 of this disclosure, image processing is executed preferentially on the sensor image data with the largest resource usage amount. Consequently, resources can be utilized more efficiently during reproduction processing. Specifically, reproduction processing can be executed favorably in reproduction mode.

Thus, with the digital camera 100 of this disclosure, user convenience is improved in the reproduction of an image.

Third Embodiment

In the third embodiment, the configuration of the digital camera, and the operation of the digital camera during continuous capture, are the same as in the first embodiment discussed above, so these will not be described again here. Only the operation of the digital camera during continuous capture that is a feature of the third embodiment will be described in detail below.

3-1. Operation of Digital Camera During Continuous Capture

The data processing operation during continuous capture that is a feature of this disclosure will now be described in detail through reference to FIGS. 5 and 8. FIG. 5 is a flowchart of the data processing operation during continuous capture.

Figure 8:
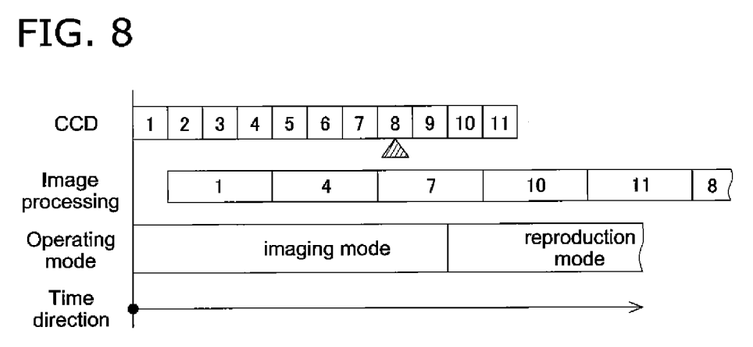
FIG. 8 is a simplified diagram illustrating the data processing operation during continuous capture pertaining to the third embodiment.

The blocks shown next to "CCD" in FIG. 8 indicate the order in which the sensor image data was produced. The blocks shown next to "image processing" indicate the sensor image data that is to undergo image processing (the numerals of the "CCD" blocks). The blocks shown next to "operating mode" indicate the operating mode being executed.

FIG. 8 shows an example when continuous capture is executed 11 times. In this case, the resource usage amount of the eighth set of sensor image data is above a specific threshold. To show this state, in FIG. 8 a triangular mark is attached to the block corresponding to the eighth set of sensor image data. The operating mode is switched from imaging mode to reproduction mode while image processing is being executed on the seventh set of sensor image data. The present technology can be applied no matter how many times continuous capture is executed.

If the controller 130 determines that the imaging is continuous capture (Yes in S103 of FIG. 4), and continuous capture data processing is executed (S105 in FIG. 4), first the CCD image sensor 120 produces the first set of sensor image data (S201). This first set of sensor image data is then recorded to the buffer memory 124.

When the sensor image data has been recorded to the buffer memory 124, the controller 130 sets a priority N for executing image processing on the sensor image data recorded to the buffer memory 124 (S202). Here, the priority N is set on the basis of the time stamp of the sensor image data and the resource usage amount of the sensor image data (an example of resource usage information). For example, since the first set of sensor image data is initial data, the priority N is the highest (N=1). More specifically, since the first set of sensor image data always has the most recent time stamp, the priority N is always the highest (N=1).

The smaller is the numerical value of the priority N, the higher is the priority. How the priority N is set (how the numerical value is set) is the same as in the first embodiment, and will therefore not be described again.

Then, the image processor 122 executes image processing on the basis of the priority N (S203). For example, the first set of sensor image data is read from the buffer memory 124, and the above-mentioned various kinds of image processing are executed on the first set of sensor image data.

As shown in FIG. 8, while this image processing is being executed, the CCD image sensor 120 produces second to fourth sets of sensor image data, for example. These three sets of sensor image data are recorded to the buffer memory 124.

As discussed above, the controller 130 then sets the priority N for executing image processing on the sensor image data recorded to the buffer memory 124 (S204). Here, the priority N is set on the basis of the time stamp of the sensor image data and the resource usage amount of the sensor image data. The setting of the priority N is not executed for data that has already undergone image processing.

For example, as a plurality of sets of sensor image data are recorded sequentially to the buffer memory 124, the controller 130 sets the priority N so that it increases from the image data with the oldest time stamp toward that with the most recent. Furthermore, the controller 130 sets the priority N so that the priority N of sensor image data whose resource usage amount is over the specific threshold is higher than the priority N of the other sensor image data.

As shown in FIG. 8, while image processing is being executed on the first set of sensor image data, since there is no sensor image data whose resource usage amount is over the specific threshold, the controller 130 sets the priority N so that it increases in the order of the second set of sensor image data, the third set of sensor image data, and the fourth set of sensor image data.

Then, when the image processor 122 finishes image processing on the first set of sensor image data, the recording-use image data that has undergone image processing is recorded to the memory card 140 (S205). The controller 130 monitors whether or not all of the image processing has been finished (S206). If all of the image processing has been finished (Yes in S206), the controller 130 ends the continuous capture data processing. On the other hand, the controller 130 continues continuous capture data processing if all of the image processing has not been finished (No in S206).

Then, if continuous capture data processing is being continued (No in S206), the controller 130 sends a command to the image processor 122 to refer to the buffer memory 124 and process the sensor image data on the basis of the above-mentioned priority N. The image processor 122 then executes image processing on the fourth set of sensor image data with the highest priority N (N=1) (S203).

While image processing is being executed on the fourth set of sensor image data, as shown in FIG. 8, a plurality of further sets of sensor image data are added to the buffer memory 124. During this time, since there is no sensor image data whose resource usage amount is over the specific threshold, the controller 130 sets the priority N just as in Embodiment 1 so that the priority N increases in the order of the second set of sensor image data, the third set of sensor image data, the fifth set of sensor image data, the sixth set of sensor image data, and the seventh set of sensor image data (S204).

Then, when the image processor 122 finishes image processing on the fourth set of sensor image data, the recording-use image data that has undergone image processing is recorded to the memory card 140 (S205). Here again, as discussed above, the controller 130 determines whether or not to continue continuous capture data processing depending on whether or not all of the image processing is finished (S206).

Then, if the continuous capture data processing is continued (No in S206), the image processor 122 executes image processing on the seventh set of sensor image data whose priority N at this point is the highest (N=1) (S203). While the image processing is being executed on the seventh set of sensor image data, a plurality of further sets of sensor image data are added to the buffer memory 124. During this time, first the controller 130 sets the priority N so that it increases from the image data with the oldest time stamp toward that with the most recent. Next, it sets the priority N so that the priority N of sensor image data whose resource usage amount is over the specific threshold is higher than the priority N of the other sensor image data (S204).

For example, the controller 130 sets the priority N so that it increases in the order of the second set of sensor image data, the third set of sensor image data, the fifth set of sensor image data, the sixth set of sensor image data, the ninth set of sensor image data, the tenth set of sensor image data, and the eighth set of sensor image data.

An example was given here of a case in which there was only one set of sensor image data whose resource usage amount was over the specific threshold. In contrast, if there are a plurality of sets of sensor image data whose resource usage amount is over the specific threshold, then the controller 130 sets the priority N so that it increases among these sets of sensor image data from the image data with the oldest time stamp toward that with the most recent. It also sets the priority N so that it increases among these sets of sensor image data as the resource usage amount increases.

Here, as shown in FIG. 8, the priority N is changed when it is recognized that the operating mode has been switched from imaging mode to reproduction mode. For example, the controller 130 changes the priority N so that the priority N of the image data with the most recent time stamp will be highest. More specifically, the controller 130 sets the priority N so that it increases in the order of the second set of sensor image data, the third set of sensor image data, the fifth set of sensor image data, the sixth set of sensor image data, the ninth set of sensor image data, the eighth set of sensor image data, and the tenth set of sensor image data.

Then, when the image processor 122 finishes image processing on the seventh set of sensor image data, the recording-use image data that has undergone image processing is recorded to the memory card 140 (S205). Here again, as discussed above, the controller 130 determines whether or not to continue continuous capture data processing depending on whether or not all of the image processing is finished (S206).

Then, if the continuous capture data processing is continued (No in S206), the image processor 122 executes image processing on the tenth set of sensor image data whose priority N at this point is the highest (N=1) (S203). During this time, the controller 130 sets the priority N so that it increases in the order of the second set of sensor image data, the third set of sensor image data, the fifth set of sensor image data, the sixth set of sensor image data, the ninth set of sensor image data, the eighth set of sensor image data, and the eleventh set of sensor image data (S204).

Then, when the image processor 122 finishes image processing of the tenth set of sensor image data, the recording-use image data that has undergone image processing is recorded to the memory card 140 (S205). Here again, as discussed above, the controller 130 determines whether or not to continue continuous capture data processing depending on whether or not all of the image processing is finished (S206).

Then, if the continuous capture data processing is continued (No in S206), the image processor 122 executes image processing on the basis of the above-mentioned priority N (S203). For example, first the image processor 122 executes image processing on the eleventh set of sensor image data (the last set of sensor image data). Similarly, the image processor 122 executes image processing in the order of the eighth set of sensor image data, the ninth set of sensor image data, the sixth set of sensor image data, the fifth set of sensor image data, the third set of sensor image data, and the second set of sensor image data.

Then, in this state, since the setting of the priority N is finished for all of the sensor image data, S204 is skipped, and the recording-use image data that has undergone this image processing is recorded to the memory card 140 (S205). If the image processing has been finished for all of the image data, the data processing operation during continuous capture is ended (Yes in S206). Also, as discussed above, the data processing operation during continuous capture is repeatedly executed until image processing is finished for all of the sensor image data (No in S206).

3-2. Effect of this Digital Camera

With the digital camera 100 in this disclosure, as discussed above, since image processing is executed with respect to a plurality of sets of image data on the basis of the priority N, even if the imaging mode is switched to reproduction mode at the end of continuous capture, the wait time for reproducing the last set of image data on the liquid crystal monitor 123 can be shortened.

Furthermore, with the digital camera 100 of this disclosure, image processing is executed preferentially on the sensor image data with the largest resource usage amount. Consequently, resources can be utilized more efficiently during reproduction processing, regardless of the timing at which the imaging mode is switched to the reproduction mode. Specifically, reproduction processing can be executed favorably in reproduction mode.

Thus, with the digital camera 100 of this disclosure, user convenience is improved in the reproduction of an image.

Other Embodiments

Examples of the technology disclosed in this application were given by describing Embodiments 1 to N, but the technology disclosed herein is not limited to this, and can also be applied to embodiments incorporating suitable modifications, substitutions, additions, omissions, and so forth. Also, new embodiments can be created by combining the various constituent elements described in Embodiments 1 to N above.

(A) In the above embodiments, an example was given in which the priority N was set for all the image data, but the priority N may instead be set for just the sensor image data with the most recent time stamp, and/or the sensor image data with the largest resource usage amount. In this case, image processing is executed on the rest of the image data in a specific order set by the controller 130.

(B) In the above embodiments, an example was given in which the priority N was set so that it increased from the image data with the oldest time stamp toward that with the most recent, but as long as the priority N of the image data with the most recent time stamp is to be highest, the priority N of the other data may be set as desired.

(C) In the above embodiments, an example was given in which the priority N was set in imaging mode, but the priority N may instead be set in reproduction mode. For example, in reproduction mode, when an image is selected directly, the user may use the interface unit 150 to raise the priority N of the selected image data corresponding to this selected image. When an image is selected and the priority N of the selected image data is set to be highest, for example, reproduction of the selected image can be executed favorably.

(D) In the above embodiments, an example was given in which the priority N was set in imaging mode, but the priority N may instead be set in reproduction mode. For example, in a state in which an image is being displayed on the liquid crystal monitor 123 in reproduction mode, the priority N may be raised for the prior and subsequent images captured before and after this image. Thus raising the priority N of the prior and subsequent images ahead of time allows the prior and subsequent images selected by the user to be favorably reproduced when the user operates the interface unit 150 (such as the cross key 205) to select the prior and subsequent images.

General Interpretation of Terms

Embodiments were described above as examples of the technology disclosed herein. The appended drawings and detailed descriptions were provided to that end. However, the constituent elements shown in the appended drawings and discussed in the detailed descriptions include not only those constituent elements that are essential to solving the problem, but also constituent elements that are not essential to solving the problem, but are given to illustrate the above-mentioned technology. Therefore, the fact that these non-essential constituent elements are shown in the appended drawings and discussed in the detailed descriptions should not necessarily be construed as implying that these non-essential constituent elements are essential.

The embodiments given above are intended to illustrate the technology disclosed herein, and various modifications, substitutions, additions, omissions, and so forth are possible within the scope of the patent claims or equivalents thereof.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the imaging device. Accordingly, these terms, as utilized to describe the present technology should be interpreted relative to the imaging device.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

INDUSTRIAL APPLICABILITY

This disclosure can be widely applied to imaging devices. More specifically, it can be applied to digital still cameras, movie cameras, portable telephones with a camera function, smart phones, and the like.

What is claimed is:
1. An imaging device, comprising:
an imaging component configured to continuously capture a subject and produce a plurality of sets of image data;
a controller configured to set a priority for executing image processing on at least one of the plurality of sets of image data; and an image processor configured to execute image processing on each of the plurality of sets of image data on the basis of the priority; wherein the controller is configured to set the priority of the image data such that the priority of new image data is higher than the priority of old image data among the plurality of sets of image data produced by the imaging component which are not being processed or previously processed by the image processor;

the controller is configured to set the priority before and while the image processor executes the image processing of image data which has a first highest priority, the first highest priority set after starting the previous image processing of the image processor;

the image processor is configured to execute image processing on the new image data which has a second highest priority after the image processor has executed the image processing of image data which has the first highest priority; and the controller is configured to change a priority order of the image data during image processing being performed by the image processor.

2. The imaging device according to claim 1, wherein
the controller is configured to set the priority on the basis of at least one of the recording information of the image data and resource usage information of the image data.

3. The imaging device according to claim 2, wherein
the controller is configured to set the priority so that the image data with the newer recording information and/or the image data with the larger resource usage information has image processing executed at a higher priority than the other image data.

4. The imaging device according to claim 3, wherein
the controller is configured to:
recognize a first mode in which a subject is captured, and a second mode in which image data is reproduced, and
set the priority of the image data with the newer recording information to be higher than the priority of the other image data if an operating mode switches from the first mode to the second mode.

5. The imaging device according to claim 4, wherein
the controller is configured to:
set the priority of the image data with the larger resource usage information to be higher than the priority of the image data with the newer recording information if the operating mode is the first mode, and
set the priority of the image data with the newer recording information to be higher than the priority of the image data with the larger resource usage information if the operating mode switches from the first mode to the second mode.

6. The imaging device according to claim 5, wherein
if the operating mode switches from the first mode to the second mode and the continuous capture ends,
the controller is configured to:
set the priority of the last captured image data to be lower than the priority of the image data with the newer recording information, and
set the priority of the last captured image data to be in between the priority of the image data with the newer recording information and the priority of the image data with the larger resource usage information.

7. The imaging device according to claim 1, wherein the image processing performed by the image processor is for rendering image data for display on a display device, the image processing including at least one selected from the following: smear correction, white balance correction, gamma correction, YC conversion processing, electronic zoom processing, compression processing, reduction processing, and expansion processing.

8. The imaging device according to claim 1, wherein the priority order of the continuously captured images as set by the controller is a non-consecutive ascending order.

9. An imaging device, comprising:
an imaging component configured to continuously capture a subject and produce a plurality of sets of image data;
a controller configured to set a priority for executing image processing on at least one of the plurality of sets of image data; and
an image processor configured to execute image processing on each of the plurality of sets of image data on the basis of the priority;
wherein the controller is configured to:
set the priority on the basis of at least one of the recording information of the image data and resource usage information of the image data;
set the priority so that the image data with the newer recording information and/or the image data with the larger resource usage information has image processing executed at a higher priority than the other image data;
recognize a first mode in which a subject is captured, recognize a second mode in which image data is reproduced, and set the priority of the image data with the newer recording information to be higher than the priority of the other image data if an operating mode switches from the first mode to the second mode;
set the priority of the image data with the larger resource usage information to be higher than the priority of the image data with the newer recording information if the operating mode is the first mode; and
set the priority of the image data with the newer recording information to be higher than the priority of the image data with the larger resource usage information if the operating mode switches from the first mode to the second mode.

10. The imaging device according to claim 9, wherein
if the operating mode switches from the first mode to the second mode and the continuous capture ends,
the controller is configured to:
set the priority of the last captured image data to be lower than the priority of the image data with the newer recording information, and
set the priority of the last captured image data to be in between the priority of the image data with the newer recording information and the priority of the image data with the larger resource usage information.

* * * * *